March 22, 1960  W. E. MARTIN  2,929,995
SYNTHETIC PLACEMENT OF A SIMULATED TARGET IN SPACE
Filed Feb. 19, 1954
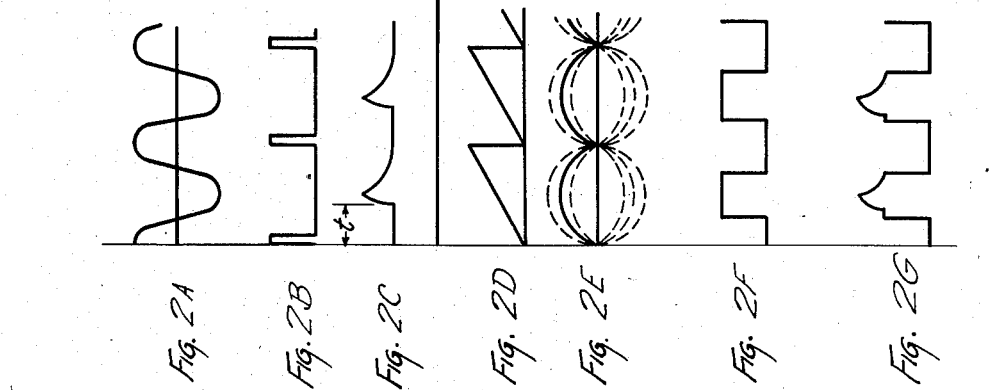
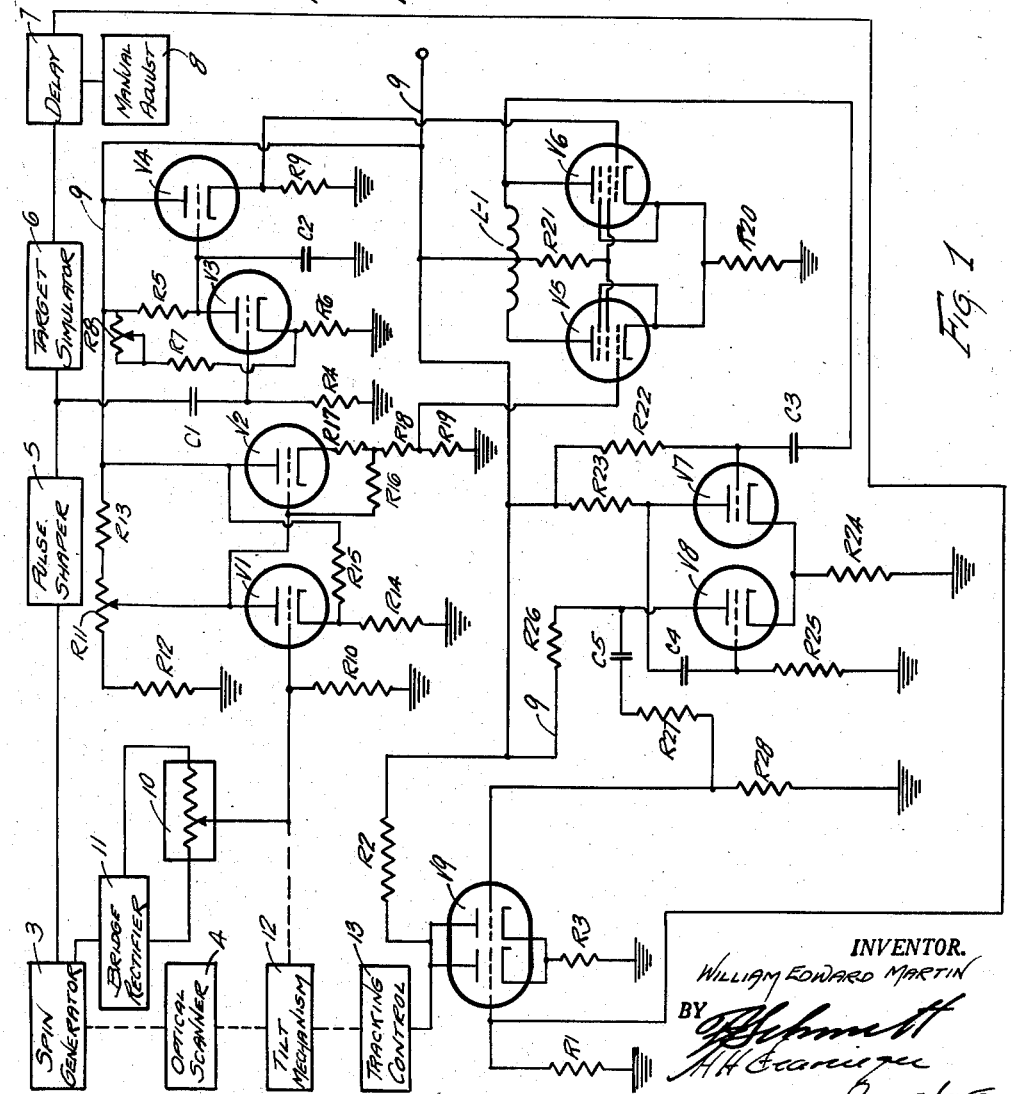
INVENTOR.
WILLIAM EDWARD MARTIN
BY
ATTORNEYS United States Patent Office 2,929,995
Patented Mar. 22, 1960

2,929,995

SYNTHETIC PLACEMENT OF A SIMULATED TARGET IN SPACE

William E. Martin, Camden, N.J., assignor, by mesne assignments, to the United States of America as represented by the Secretary of the Navy Application February 19, 1954, Serial No. 411,589

1 Claim. (Cl. 324—158)

The present invention relates to novel and improved apparatus for evaluating and testing the accuracy of operation of an electronically controlled optical scanning system of the meridian type and more particularly to testing apparatus for such an optical scanning system whereby the physical movements of the scanning device as well as the trace on a cathode ray tube display can be observed visually as the scanning device follows or tracks a simulated target in space.

In optical scanning systems of the type with which the present invention is concerned the natural temperature differential between the target or object and the surrounding space is often relied on to produce infrared radiations or the like which are received on and collected by a suitable optical lens assembly or the like that revolves at a constant rate about an axis that is modified by a tracking servo to be perpendicular to the target position. The radiations are then used to first search for and indicate the presence of a target within a predetermined area and thereafter to continuously follow or track the target as it changes its position in the area. Although it is often necessary and desirable to check and/or recalibrate the circuits and apparatus which form a part of the optical scanning system and although some testing apparatus and procedures have been tried, considerable difficulty has been experienced in devising test apparatus which is relatively simple in construction and yet reliable in operation.

It is a principal object of the present invention to provide a novel and improved means for generating a controlled simulated target pulse which is adapted to be used to check the accuracy of operation of an optical scanning device of the meridian type.

Other objects and many of the attendant advantages of this invention will be readily appreciated as the same becomes better understood by reference to the following detailed description when considered in connection with the accompanying drawings wherein:

Figure 1 is a circuit diagram of an embodiment of the present invention.

Figures 2A through 2G are waveforms which are produced at selected points of the circuit shown in Figure 1.

In general the improved apparatus of the present invention is adapted to provide the optical scanning apparatus, which is to be checked and tested, with a controlled electrical impulse which represents a signal that is being received from a target or object located at a predetermined point in space. By making this impulse dependent upon the coincidence of three variable voltage functions which respectively represent the azimuth, the elevation, and the spin angle of the optic about its axis, the operator is able to simulate a new target position in space by merely varying one or more of these functions. Accordingly, the apparatus of the present invention includes means for producing a first voltage potential which is a function of the azimuth position of the optical scanner, means for producing a second voltage potential which is a function of the elevation of the optical scanner, means for producing a third voltage potential which is a function of the spin angle of the simulated target, and means for combining the three voltage potentials to produce a signal which represents a predetermined target position in space. It has been found that by delivering this signal to the tracking control apparatus of an optical scanning device, the same can be readily and conveniently checked and adjusted for improved accuracy in operation as it follows or tracks an actual object or target in space.

The detailed circuit diagram of the present invention is shown in Figure 1 of the drawing. As illustrated therein the spin generator 3 is mechanically coupled to the rotating optical scanning device 4 in any suitable manner and as will be more apparent hereinafter thereby provides the cosine output voltage which is shown in Figure 2A of the drawing and which is dependent upon the constant rate at which the spin generator is driven. The output of the spin generator is connected as shown to the pulse shaping circuit 5 which may be of any suitable conventional design and which produces the pulse shown in Figure 2B of the drawing at a predetermined reference point of each cycle of the cosine. The output of the pulse shaping circuit 5 drives the target simulating circuit 6 which is coupled to the grid of the tube V–9 through the manually adjustable delay network 7 and 8 and resistor R–1 producing a target at a predetermined spin angle. The plate circuit of the left half of tube V–9, which will be more apparent hereinafter forms a mixer circuit, extends from the positive voltage supply line 9 through resistor R–2, the tube, and resistor R–3 to ground.

The output of the pulse shaping circuit 5 is also coupled to the grid of tube V–3 through condenser C–1 and resistor R–4. The plate circuit of tube V–3 extends from positive voltage supply line 9 through resistor R–5, the tube and resistor R–6 to ground. The cathode of V–3 is also preferably tied as shown to the positive voltage supply line 9 through resistor R–7 and potentiometer R–8. The plate of V–3 is connected to the grid of the cathode follower V–4 and also to ground through condenser C–2. The plate circuit of the cathode follower V–4 extends from the positive voltage supply line 9 through the tube and resistor R–9 to ground. The cathode of V–4 is preferably directly connected as shown to the control grid of tube V–6 which as will be more apparent hereinafter together with tube V–5 forms a coincidence circuit.

The cosine wave output of the spin generator 3 is also coupled to the tilt potentiometer 10 through the bridge rectifier circuit 11 which is of any suitable conventional design. As shown in the drawing the variable arm of the tilt potentiometer is mechanically coupled to the tilting mechanism 12 such that the amplitude of the rectified pulses of the cosine wave is controlled in the manner shown in Figure 2E of the drawing. The output of the tilt potentiometer is preferably directly coupled to the grid of the D.C. amplifier V–1 by means of resistor R–10. The plate circuit of the D.C. amplifier extends from the variable arm of potentiometer R–11, which together with resistors R–12 and R–13 form a resistor divider network between the positive voltage supply line 9 and ground, through the tube and resistor R–14 to ground. As shown in the drawing the cathode of V–1 is also preferably coupled to the plate of the cathode follower V–2 through resistor R–15. The grid of the cathode follower which is connected directly to and driven by the plate of the D.C. amplifier V–1 is also connected to its cathode circuit by means of resistor R–16. The plate circuit of V–2 extends from the positive voltage supply line 9 through the tube and resistors R–17, R–18, and R–19 to ground. The junction of resistors R–18 and R–19 in the cathode circuit of V–2 is tied to the control grid of tube V–5 which as has been indicated heretofore together with tube V-6 embody a coincidence circuit.

The cathodes and suppressor grids of tubes V-5 and V-6 of the coincidence circuit are connected together and are also connected to ground through resistor R-20. The plates of tubes V-5 and V-6 are connected together by means of the saturable reactor L-1, the center tap of which is connected to the positive voltage supply line 9 and to the interconnected screen grids of tubes V-5 and V-6 through resistor R-21.

The output of tube V-6 and the coincidence circuit is coupled to the grid of tube V-7 through condenser C-3 which is also tied to the positive supply line 9 through resistor R-22. The plate circuit of V-7 extends from the positive supply line 9 through resistor R-23 the tube and resistor R-24 to ground. The plate of tube V-7 is coupled to the grid of tube V-8 by means of condenser C-4 and resistor R-25. The plate circuit of V-8 extends from the positive supply line 9 through resistor R-26, the tube, and resistor R-24 to ground.

The plate of tube V-8 is coupled to the right hand section of tube V-9 by means of condenser C-5 and resistors R-27 and R-28. As indicated heretofore the grid of the left hand section of tube V-9 is coupled to and driven by the output of the target simulator circuit 6. The plate of the right and left hand sections of V-9 are tied together and are connected to the positive supply line 9 through resistor R-2 whereas their cathodes which are also tied together are connected to ground through resistor R-3. The plates of each of the sections of tube V-9 are coupled to the tracking control circuit 13 of the tilt mechanism 12 of the optical scanner system so as to control the same in a manner which will be described more fully hereinafter.

In operation the spin generator 3 which is mechanically coupled to the optical scanner 4 delivers its cosine wave output to the pulse shaping circuit 5 which is of any conventional design and which initiates a reference pulse such as that shown in Figure 2B of the drawing at a predetermined point of each cycle of the cosine wave. This reference pulse from the pulse shaping circuit is then used to drive the target simulator 6 which develops a pulse which is of the proper wave shape and duration to simulate a target pulse received from space. This target pulse is then delayed as shown in Figure 2C of the drawing a controlled amount by means of the delay network 7 and the manual adjust device 8 so as to properly position the spin angle or azimuth bearing of the simulated target. It is then delivered to the mixing circuit which includes tube V-9 and its associated circuits and which will be described more fully hereinafter.

The output of the pulse shaping circuit 5 which produces the reference pulse shown in Figure 2B of the drawing is also operatively connected to the input of the sawtooth generator circuit which includes tubes V-3 and V-4 and their associated circuits. More specifically, condenser C-2 is periodically charged linearly in the manner shown in Figure 2D of the drawing by a circuit which extends from the positive voltage supply line 9 through resistor R-5 to ground. On the occurrence of the reference pulse, however, the grid of tube V-3 is lifted instantaneously, the tube V-3 is gated and the charge on condenser C-2 is quickly dissipated to produce the fly back portion of the sawtooth wave. In this way the instantaneous magnitude of this sawtooth wave which is produced across condenser C-2 continuously provides an accurate indication of the azimuth position of the optical scanning device 4. The sawtooth wave is then passed through the cathode follower V-4 to the control grid of tube V-6 which together with tube V-5 and their associated circuits form a coincidence circuit which will be described more fully hereinafter.

The cosine output of the spin generator 3 is also coupled to the bridge rectifier 11 and the tilt potentiometer 10. Inasmuch as the variable arm of the potentiometer 10 is mechanically coupled to the tilt mechanism 12 and moves in step therewith, the output of potentiometer shown in Figure 2E of the drawing provides a signal which is proportional to the instantaneous angular disposition of the tilting mechanism. This signal is then fed through the D.C. amplifier V-1 and the cathode follower V-2 to the control grid of tube V-5 in the coincidence circuit. The variable resistor R-11 in the plate circuit of tube V-1 provides a D.C. level adjusting means which permits manual control of the average elevation angle about which the scanning device tilts.

In the coincidence circuit the inductive reactance of the saturable reactor L-1 is designed to vary appreciably only when the plate current through tube V-5 and the left half of reactor L-1 becomes substantially equal to the plate current through tube V-6 and the right half of reactor L-1. This occurs as shown in Figure 2F of the drawing when the sawtooth voltage on the control grid of tube V-6 which is proportional to the azimuth position of the optical scanner becomes substantially equal to the D.C. voltage on the control grid of tube V-5 which reflects the instantaneous elevation angle of the optical scanner.

The output of the coincidence circuit which is therefore dependent upon the elevation angle of the optical scanner is then fed through the pulse shaping circuit which includes tubes V-7 and V-8 to the mixer tube V-9 where it is combined as shown in Figure 2G of the drawing with the spin angle pulse from the delay network 7 to drive the tracking control circuit 13 when they occur simultaneously.

It has been found that the output circuit of the coincidence tubes V-5 and V-6 periodically provide a series of so-called pedestal pulses which occur at progressively increased phase angles between predetermined phase angle limits during each cycle of the spin generator. These pedestal pulses have been found to represent the instantaneous angles of elevation of the simulated target. By adjusting resistor R-11 in the plate circuit of tube V-1 and therefore the D.C. level of the output of that tube the desired angle of elevation of the simulated target may be varied and controlled. Thus, when any one of this series of pedestal pulses coincides in time in the mixing circuit of tube V-19 with the delayed pulse from the target simulator 6 the preselected bearings of the simulated target are properly described in azimuth and elevation and the conventional tracking control tilt mechanism circuits of the optical scanning system track the target as it changes its position. Thus, it is seen that by means of the above described circuit a controlled simulated target signal has been produced which can be used to energize the tilt apparatus as well as the other component parts of the optical scanning system so that the operation thereof may be checked by means of visual observation of the scanner and/or the trace of the simulated target on the screen of a cathode ray tube associated therewith.

Obviously many modifications and variations of the present invention are possible in the light of the above teachings. It is therefore to be understood that within the scope of the appended claim the invention may be practiced otherwise than as specifically described.

What is claimed is:

Test apparatus for an optical scanning device having a tilt mechanism comprising a sinewave generator which rotates in synchronism with the scanning device about its azimuth axis; a pulse shaping circuit coupled to the sinewave generator that produces a reference pulse for each cycle of the sinewave generator; a target simulating and adjustable delay circuit which is coupled to the pulse shaping circuit and which provides a target pulse that occurs a controlled interval after the said reference pulse; a sawtooth generator circuit coupled to the output of the pulse shaping circuit, the discharge cycle of the sawtooth generator being synchronized with and initiated by the reference pulse produced by the pulse shaping circuit; a bridge rectifier circuit coupled to the output of the sinewave generator; a tilt potentiometer which is electrically connected to the output of the rectifier and which has its variable arm mechanically coupled to the tilt mechanism of the scanning device; means for adjustably controlling the direct current level of the output of the tilt potentiometer; a coincidence circuit which is coupled to the tilt potentiometer and the sawtooth generator and which produces a pedestal output voltage when the instantaneous output voltages thereof become substantially equal in amplitude; and a mixing circuit which is responsive to the simultaneous incidence of the pedestal output voltage of the coincidence circuit and the delayed target pulse of the target simulating circuit and which controls operation of the scanning device.

References Cited in the file of this patent

UNITED STATES PATENTS

| | | |
|---|---|---|
| 2,414,477 | Meacham | Jan. 21, 1947 |
| 2,422,698 | Miller | June 24, 1947 |
| 2,440,261 | Ginzton | Apr. 27, 1948 |
| 2,446,024 | Porter et al. | July 27, 1948 |
| 2,550,700 | Lancor | May 1, 1951 |
| 2,698,932 | Wathen | Jan. 4, 1955 |
| 2,784,402 | White | Mar. 5, 1957 |